US012216480B2

(12) United States Patent
Takahashi et al.

(10) Patent No.: US 12,216,480 B2
(45) Date of Patent: Feb. 4, 2025

(54) AIRCRAFT MULTI-LIFT SYSTEM WITH SYNCHRONIZED MANEUVERING AND LOAD FEEDBACK CONTROL

(71) Applicant: The United State of America as represented by the Secretary of the Army, Washington, DC (US)

(72) Inventors: Marc D Takahashi, Cupertino, CA (US); Matthew S Whalley, Sunnyvale, CA (US); Marcos G. Berrios, California, MD (US)

(73) Assignee: United States of America, as represented by the Secretary of the Army, Washington, DC (US)

( * ) Notice: Subject to any disclaimer, the term of this patent is extended or adjusted under 35 U.S.C. 154(b) by 57 days.

(21) Appl. No.: 16/865,301

(22) Filed: May 1, 2020

(65) Prior Publication Data
US 2022/0390963 A1    Dec. 8, 2022

(51) Int. Cl.
 B64D 1/22  (2006.01)
 G05D 1/00  (2024.01)
(52) U.S. Cl.
 CPC ........... G05D 1/104 (2013.01); B64D 1/22 (2013.01); G05D 1/102 (2013.01)
(58) Field of Classification Search
 CPC ........... G05D 1/104; G05D 1/102; B64D 1/22
 (Continued)

(56) References Cited

U.S. PATENT DOCUMENTS

| 3,746,279 | A  | * | 7/1973  | Maciolek | G05D 1/104 |
|           |    |   |         |          | 244/194    |
| 2003/0192744 | A1 | * | 10/2003 | Green | B66F 7/20 |
|           |    |   |         |          | 187/277    |

(Continued)

FOREIGN PATENT DOCUMENTS

CN          108319296 A  *  7/2018  ............. G05D 1/104

OTHER PUBLICATIONS

Morten Bisgaard, Anders la Cour-Harbo and Jan Bendtsen, 2009, Aerospace Research Central <https://arc.aiaa.org/doi/10.2514/6.2009-5795> (Year: 2009).*

Primary Examiner — Marc Burgess
Assistant Examiner — Karen Lynelle Furgason
(74) Attorney, Agent, or Firm — Karen G. Hazzah

(57) ABSTRACT

Systems and methods are disclosed to transport a common load attached by slings by two or more Vertical Take Off and Landing (VTOL) aircraft using synchronized maneuvering and load feedback control. In one embodiment, a system includes: a unit configured to direct the load operation with macro level commands input by a system operator; a unit, on each aircraft, configured to estimate its state; a unit configured to measure the sling load forces on each aircraft; a unit configured to release the load from the aircraft; a unit configured to allow all aircraft to share their load data and aircraft state data; a computing system on each aircraft with access to the shared data and the ability to control the aircraft control effectors and sling release mechanism; and a computing unit configured to execute a Guidance & Navigation system (or equivalent) and a Multi-Lift Autonomous Flight Control System (MLAFCS) with Multi-Lift Synchronized Maneuvering, Load Distribution Regulation, and Load Swing Feedback (or equivalent) on the aforementioned computing unit.

14 Claims, 10 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 2009/0152391 | A1* | 6/2009 | McWhirk | B64B 1/70 244/30 |
| 2015/0120126 | A1* | 4/2015 | So | G01C 21/34 701/26 |
| 2015/0330847 | A1* | 11/2015 | McNeilly | G01L 1/246 73/800 |
| 2017/0334561 | A1* | 11/2017 | Sopper | B66D 5/026 |
| 2019/0227540 | A1* | 7/2019 | Suvitie | G05D 1/104 |
| 2020/0087121 | A1* | 3/2020 | Ohayon | B64C 27/82 |
| 2020/0180763 | A1* | 6/2020 | Schütz | G05D 1/104 |
| 2021/0329466 | A1* | 10/2021 | Khasnabish | H04W 16/10 |

* cited by examiner

191

192

190

AIRCRAFT MULTI-LIFT SYSTEM WITH SYNCHRONIZED MANEUVERING AND LOAD FEEDBACK CONTROL

FIELD OF THE INVENTION

This invention relates generally to controlling the flight of Vertical Take Off and Landing aircraft and, more specifically, to methods and systems for transporting a sling-suspended cargo load using multiple full-scale Vertical Take Off and Landing aircraft operating in coordinated maneuvers.

BACKGROUND

A distinct advantage of Vertical Take Off and Landing (VTOL) aircraft for cargo delivery is their ability to fly in forward flight and to hover where loads can be gently set down without dropping or parachuting them in. As the desire to carry heavier loads has expanded over the decades, proposed solutions have tended toward the building of larger aircraft to meet the demand. Building progressively larger aircraft quickly reaches a practical size limit when considering the cost/benefit of developing specialized heavy-lift aircraft that are needed only for those missions where the load cannot be divided up.

Sharing the load among two or more aircraft is an alternate possibility, but this has not gained widespread use. This solution requires high pilot workload making some form of automation necessary to make the operation manageable. Several issues have to be dealt with to realize a usable multi-lift solution. One issue is keeping the aircraft a safe distance from each other while simultaneously flying in the formation to the final delivery destination. Another issue is keeping the sling load forces on each aircraft within acceptable bounds so to not exceed aircraft power limits or underload the sling causing it to go slack putting the load on the other aircraft. This is very important when the aircraft are maneuvering in uncertain wind conditions near their upper power limits, and where exceeding these limits could be catastrophic. Finally, when placing the load on the ground controlling the sideward motion may be important to precisely place the load in a timely manner and to keep it from tipping over.

All these issues must be dealt with, while simultaneously minimizing the amount of work for pilots and ground crews whether the aircraft are manned or autonomous. This means minimizing or reducing the amount of manual piloting of the system. It also means, minimizing the amount of ground crew interaction during the attachment or release phase. Ground crew interaction requiring any preparation work, such as having to instrument the payload with complex avionics, should also be avoided. A system must also minimize the amount of shared data between the operator and the system and between the aircraft themselves as the data links will never be as reliable as a laboratory setting.

The work in U.S. Pat. No. 3,746,279 is a dual lift system using a spreader bar where the lead aircraft and the following aircraft are manually piloted simultaneously as a formation through an electro-mechanical control system that synchronizes the inputs to both aircraft. Their load equalization method is passive in the sense that is it accomplished by geometric means of holding the relative position of the two vehicles such that the cable angles from the vehicle are perpendicular to the spreader bar rather than by direct measurement of the loads. The work in U.S. Pat. No. 8,761,968 handles the multi-lift problem by flying the vehicles as an automated swarm carrying the load together. The payload is instrumented with an avionics unit and a remote central controller calculates the trajectories of the participating aircraft to move the load along the desired path. These vehicle trajectories are then transmitted to each vehicle trajectory-following control laws to move the load along this path.

BRIEF SUMMARY

Described herein are systems and methods to transport a common load attached by slings by two or more Vertical Take Off and Landing (VTOL) aircraft using synchronized maneuvering and load feedback control. In one embodiment, a system includes: a unit configured to direct the load operation with macro level commands input by a system operator; a unit, on each aircraft, configured to estimate its state; a unit configured to measure the sling load forces on each aircraft; a unit configured to release the load from the aircraft; a unit configured to allow all aircraft to share their load data and aircraft state data; a computing system on each aircraft with access to the shared data and the ability to control the aircraft control effectors and sling release mechanism; and a computing unit configured to execute a Guidance & Navigation system (or equivalent) and a Multi-Lift Autonomous Flight Control System (MLAFCS) with Multi-Lift Synchronized Maneuvering, Load Distribution Regulation, and Load Swing Feedback (or equivalent) on the aforementioned computing unit.

In various embodiments: the common load need not to be directly instrumented; the slings have intermediate equipment such as a spreader bar between the attachment point and the load; when transporting the load, one of the aircraft is designated as the primary aircraft and the remaining as the secondary aircraft and move in a formation set by the primary aircraft at the behest of the operator; the system operator has a communication link with the primary aircraft system and uses high level macro commands (e.g. formation, pivot, translate, set course and speed, and set climb and coordinated-turn rate) to guide the system with a potentially low bandwidth data communication link; the system operator may or may not be with the formation, but has the necessary bandwidth and allowable latency to direct the load transportation operation; the aircraft state measurement and estimation system includes, position, velocity, accelerations, attitude, attitude rate, air speed, altitude above ground level, and relative position amongst the aircraft, and any other measurement necessary to support a path following control law navigating the aircraft on a commanded path; on each aircraft the slings hang down off of the attachment point where a load measurement system detects the three axis force from the sling or equivalently the sling tension and the angle between the extended sling and the aircraft; the release mechanism is available to the operator the computing unit to trigger either an operational intended release or an automatic emergency release; the shared data are shared amongst all the participating entities using reliable communication equipment with necessary bandwidth and latency; the computing units on each aircraft have access to all the shared data and command data resulting from directions from the operator and can send commands to the aircraft effectors, control the release mechanism and run the control laws of the Guidance & Navigation system; each aircraft has a Guidance & Navigation system (or equivalent) and a MLAFCS (or equivalent) running as either the primary aircraft or the secondary aircraft; the Guidance & Navigation system accepts macro commands to the primary aircraft from the operator (or an intermediary) and converts them into Waypoint Trajectory (spline or curve fit data to generate position, velocity, and acceleration) or Vector Command (speed, heading, and climb, or equivalent) inputs to the primary Waypoint Control system; the Waypoint Control system converts its inputs into a stream of position and velocity tracking commands that are delayed and sent to the primary aircraft Path Tracking; the Path Tracking module uses feedback from the estimates to generate inputs sent to the aircraft effectors to make the aircraft follow the desired path; the Waypoint Control system sums the position and velocity tracking commands of the primary aircraft with the Primary Formation Controller (PFC) outputs and then delays and subsamples the sums to a lower rate before sending to the secondary aircraft Waypoint Control as part of Primary-to-Secondary Commands comprising time, and primary and secondary position and velocity commands; the PFC uses the shared data to calculate the relative positions of the secondary aircraft with respect to the primary aircraft based on instructions from the operator or resulting from such instructions; the secondary aircraft receive the Primary-to-Secondary Commands and send velocity commands to the respective secondary Waypoint Control through the Vector Command interface; the secondary Waypoint Controller uses a feedback controller to synchronize the secondary integrated position with the primary position using feedback elements (e.g. proportional-integral blocks, limiters, etc.) to avoid position command drift between primary and secondary aircraft; the secondary Waypoint Controller sums the synchronized position and velocity tracking commands of the secondary aircraft with the Secondary Feedback Controller (SFC) outputs before being sent to the secondary aircraft Path Tracking; the SFC uses the shared data and feedback blocks (e.g. Proportional-Integral controller, limiters, etc.) to regulate the load on its own secondary sling by generating position changes of the secondary relative to the PFC commanded formation; the PFC provides feedforward changes to the formation using the shared data; the Load Swing Feedback (LSF) on all aircraft use the shared data and feedback elements to generate aircraft effector inputs that damp the unconstrained swinging motion of the load; the shared data is used to monitor the loads and load release mechanism of all aircraft to release the load on all aircraft if from an operational request or when an emergency situation is detected.

In one embodiment, wherein the SFC is operable to use the shared aircraft sling load data, shared aircraft state data, and feedback blocks to regulate the load on its own secondary sling by generating position changes of the secondary relative to the PFC commanded formation.

In another embodiment, the Waypoint Control system further operable to provide feedforward changes to the formation using the shared aircraft sling load data and shared aircraft state data.

In yet another embodiment, the Load Swing Feedback (LSF) on all aircraft use the shared aircraft sling load data and shared aircraft state data and feedback elements to generate aircraft effector inputs that damp the unconstrained swinging motion of the load.

In still another embodiment, ]the shared aircraft sling load data and shared aircraft state data is used to monitor the loads and load release mechanism of all aircraft to release the load on all aircraft if from an operational request or when an emergency situation is detected.

DETAILED DESCRIPTION

Disclosed herein are embodiments of a multi-lift system that transports a heavy sling-suspended cargo load using multiple full-scale Vertical Take Off and Landing (VTOL) aircraft operating in coordinated maneuvers. Aircraft in formation, including VTOL aircraft, use autonomous path tracking guidance feedback control laws that are synchronized by the system to effect coordinated maneuvering of the entire VTOL aircraft formation, thus avoiding collision. Embodiments disclosed herein handle the heavy load by synchronizing the VTOL aircraft's path-tracking flight control systems while simultaneously using feedback to regulate the sling load forces and load swing motions.

More specifically, embodiments disclosed herein address the problem of multi-lift transport problem using a load measurement system at the sling attachment point of each VTOL aircraft, in combination with feedback from the load sensors that is used to control the load distribution on each VTOL aircraft. The load measurement system senses the forces from the slings. The system uses feedback from the load sensors to control the load distribution on each VTOL aircraft, by moving each VTOL aircraft small perturbations from its nominal formation position. This feedback advantageously regulates the load distribution while maneuvering in gusty environments. In addition, the system uses feedback to the VTOL aircraft controls to reduce the load swing motion.

The system architecture described herein accomplishes the above features automatically, allowing high level macro commands (e.g. takeoff, land, pivot, translate, set course and speed, set climb and coordinated-turn rate) sent over a relatively low bandwidth link. This system architecture enables embodiments in which the operator station is co-located in one of the VTOL aircraft, and other embodiments in which the operator station is located at a distant base. Another advantage of the embodiments described herein is that data communication between VTOL aircraft in the formation is designed to keep the data rates low. Complex trajectory calculations are distributed to each aircraft instead of being calculated at a centralized control unit. Still another advantage of the embodiments described herein is that the job of the ground crew is simplified. Because the load measurement system is placed at the attachment point rather than using instrumentation at the load itself, the ground crew simply attaches the load to the slings.

Figure 1:
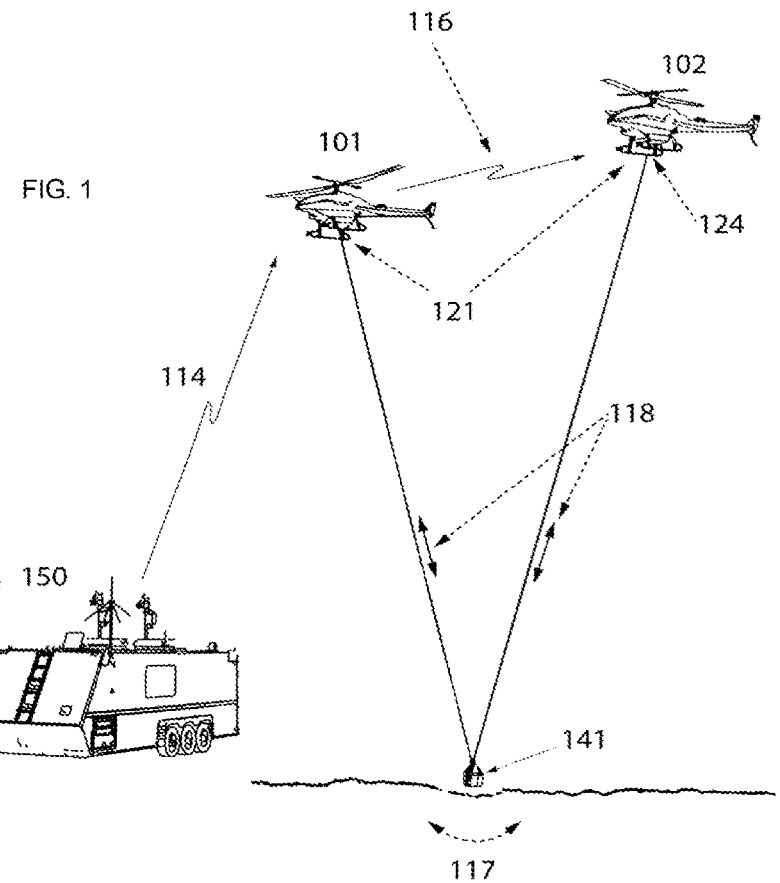
FIG. 1 is a diagram illustrating an example environment in which the multi-lift system with synchronized maneuvering and load feedback control operates, according to embodiments disclosed herein.

Having briefly introduced various inventive features, additional details will now be discussed in the context of the figures. FIG. 1 illustrates an example environment in which the multi-lift system operates. For the sake of brevity, the inventive multi-lift system will be referred to hereinafter as the "multi-lift system." In the example embodiment of FIG. 1, the load is shared by two aircraft in formation. All embodiments shown herein designate one aircraft as the primary aircraft 101 and the remaining as the secondary aircraft 102. Several inventive features are illustrated in the high-level diagram of FIG. 1. The primary aircraft 101 is directed with low bandwidth macro commands 114 from the operator station 150. The primary aircraft 101 directs the secondary aircraft 102 into the desired nominal formation with low bandwidth inter-aircraft formation commanding 116. The sling loads are measured from load sensors 121 on each aircraft attachment point and the sling load distribution feedback 118 moves each secondary aircraft small perturbations from the nominal formation to regulate the sling tensions. The load measurements are also used to increase load swing-motion damping with load swing feedback 117. A sling release safety system 124 simultaneously releases all load cables if any one of the load cables are released.

Figure 2A:
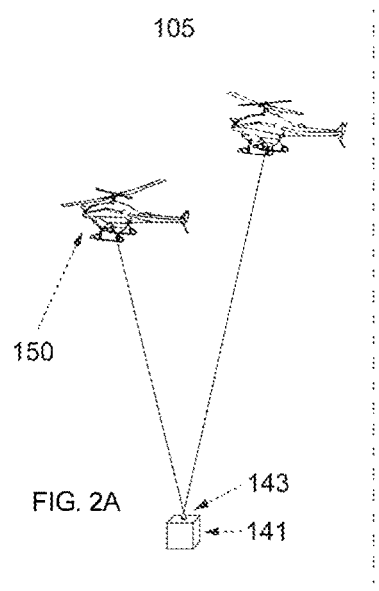
FIG. 2A is a diagram illustrating a dual-lift pendant formation of VTOL aircraft, one having an operation station onboard one of the aircraft in the formation, in the multi-lift system with synchronized maneuvering and load feedback control, according to embodiments disclosed herein.
Figure 2B:
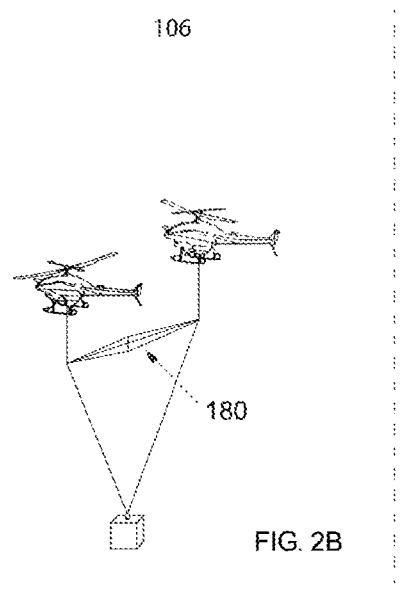
FIG. 2B is a diagram illustrating a dual-lift pendant formation of VTOL aircraft, one using a spreader bar, in the multi-lift system with synchronized maneuvering and load feedback control, according to embodiments disclosed herein.
Figure 2C:
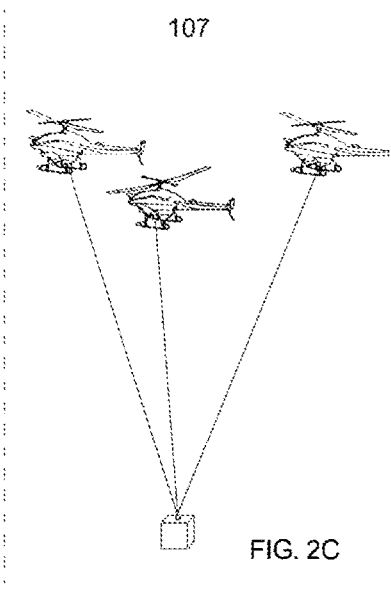
FIG. 2C is a diagram illustrating a tri-lift pendant formation of VTOL aircraft in the multi-lift system with synchronized maneuvering and load feedback control, according to embodiments disclosed herein.

Alternate embodiments could have other formation and additional aircraft if desired where they are arranged to distribute the load to suit the mission. Several such examples are shown in FIGS. 2A, 2B, and 2C. FIG. 2A depicts a Dual-Lift pendant formation 105 that suspends the load by slings that meet at a single point 143 above the payload 141, but in this embodiment, the operator station 150 is onboard one of the aircraft. In various embodiments, the aircraft are in a side-by-side formation, a nose-to-tail formation, and variants in between; they could be at staggered altitudes. FIG. 2B depicts a Dual Lift Spreader Bar formation 106 that uses a spreader bar 180. This device absorbs some or all of the sideward forces from the load on the aircraft and the payload is suspended in a pendant configuration below the spreader bar. This configuration reduces the power needed to keep the aircraft apart, but at the cost of the bar's weight and logistics of making it available for lifting operations. FIG. 2C depicts a Tri-lift pendant formation 107 using a pendant formation. In this formation the load is fully constrained, and, as such, makes the load swing motion feedback unnecessary.

Figure 3:
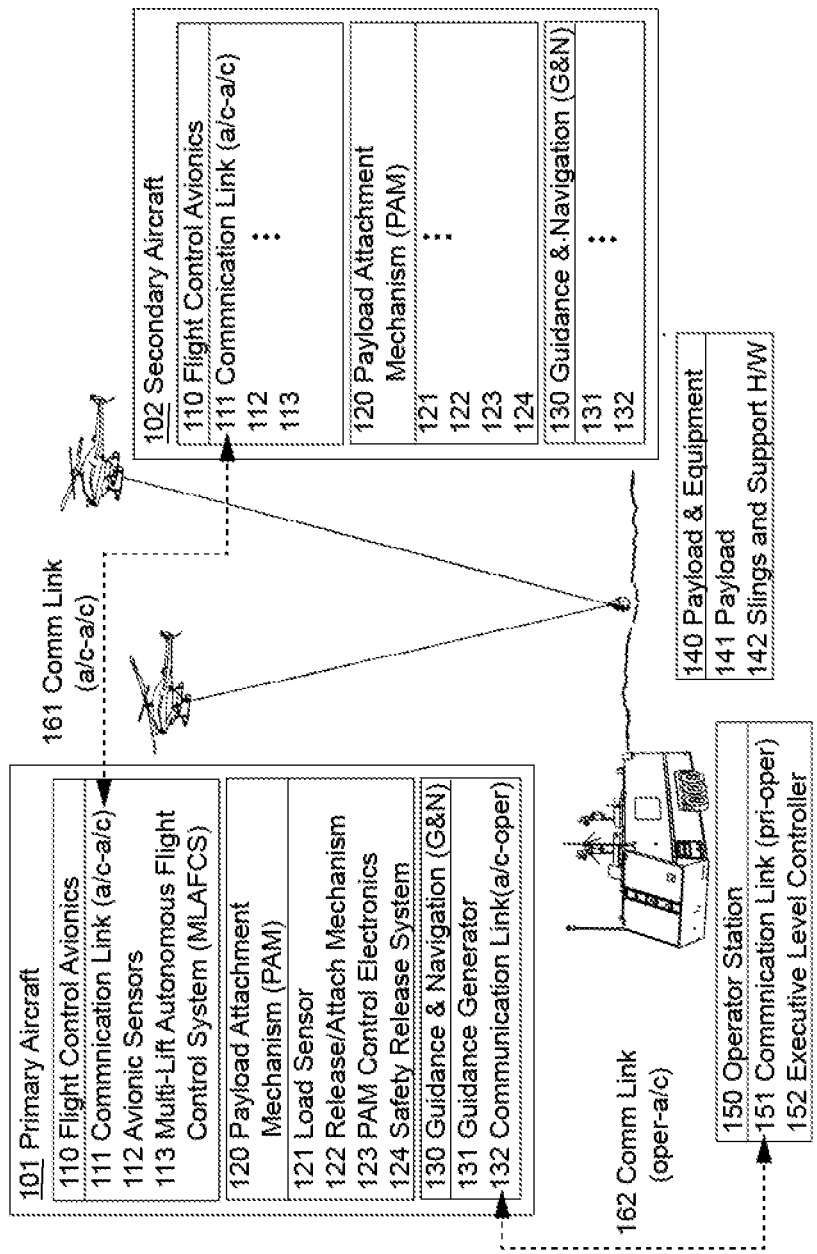
FIG. 3 is a logical block diagram of the multi-lift system with synchronized maneuvering and load feedback control, including a primary VTOL aircraft, a secondary VTOL aircraft, an operator station, a payload suspended by slings, and components thereof, according to embodiments disclosed herein.

The basic components of the multi-lift system are shown in the block diagram of FIG. 3. As mentioned previously, the multi-lift system is arranged such that the primary aircraft 101 directs the secondary aircraft 102 into the desired formation. The secondary aircraft 102 only moves itself relative to the primary's commanded formation and does so to effect changes in the sling tensions as part of the sling load distribution feedback. All aircraft have the same equipment, so any aircraft can assume the role of the primary. The operator station 150 can communicate with the primary Guidance & Navigation (G&N) system 130 using a low bandwidth high latency communication link (151, 162, and 132). This link can be a higher quality, but the system assumes a lower quality service between the operator station 150 and the primary aircraft 101. Other embodiments place the operator station 150 on one of the aircraft traveling with the formation. In either case, the operator has access to a high level executive controller 152 to plan and manage the entire mission.

The payload and support equipment 140 consists of a sling and support hardware 142 attached to the payload 141 and to each aircraft payload attach/release mechanism 122. No direct instrumentation of the payload is required, thus the ground crew has no need to perform any expensive and time consuming preparation, such as attaching and calibrating a flight critical measurement system to the payload. The load equipment could also include a spreader bar (180 in FIG. 2) to shorten the effective length of the pendulum for the same amount of side force on each aircraft.

On the underside of each aircraft is a Payload Attachment Mechanism (PAM) 120 where the sling is connected. This system has a load sensor 121 to measure the sling three axis forces (or equivalently the tension and the cable angles relative to the aircraft) and an electro-mechanical device to attach and release the sling 122. The PAM control electronics 123 provides the means to interact with the device though the release/attach mechanism 122.

A significant risk of any aircraft sling load operation is entanglement of the load or cable with fixed objects on the ground. With multi-lift there is the added danger of entangling each other or one aircraft suddenly releasing its cable putting its load share on the other aircraft. Finally, there is a risk that system maneuvers or the disturbance environment will cause an unsafe load on an individual aircraft. To mitigate these risks, the PAM 120 also includes a sling release safety system 124, which releases the load from all other aircraft if any one releases the load. The system may also use the load forces to initiate a release if a load exceedance threshold is sensed.

Each aircraft has the same Flight Control Avionics 110, which consists of aircraft-to-aircraft communication 111 equipment providing a reliable low latency link 161 for aircraft to aircraft data exchange. Avionics sensors 112 are installed allowing estimation of the aircraft attitude rates, attitudes, accelerations, velocity, and positions. These avionics may include an Embedded Global Positioning System/ Inertial Navigation System (EGI), Radar Altimeters, Air Data Systems, etc. The Multi-Lift Autonomous Flight Control System (MLAFCS) 113 uses these aircraft states and load measurements from the load sensor 121 to command the aircraft control actuators. These controls gives each aircraft their path following ability and also provides the means to co-ordinate the formation flying and control the load.

All aircraft have a Guidance & Navigation (G&N) system 130 to direct the respective aircraft. However, when in formation flight, only the primary aircraft's G&N system 130 is being directed by the operator station 150. In various alternative embodiments, the G&N system 130 has varying levels of sophistication, from predetermined fixed waypoint flying to a reactive autonomous system. The latter involves installing a terrain sensor mounted on the nose of the primary aircraft 101 to scan the area ahead of the aircraft. This scan data is then used by an Obstacle Field Navigation system to avoid hitting objects and a Safe Landing Area Determination system is used to find safe points to land or place the load. If all aircraft are equipped the same, any aircraft can be designated as the primary and the others as secondary, where the primary G&N system 130 is used to direct the formation.

In some embodiments of the system, some of these subsystems could be spread though out the aircraft. For example the PAM 120 would be mounted under the aircraft center of gravity, while the avionics sensors would be distributed though the aircraft separate from, though still communicating with, the MLAFCS 113 system. Some of the aircraft avionics, such as the EGI, may be shared by other subsystems that serve other functions unrelated to the multilift.

Figure 4:
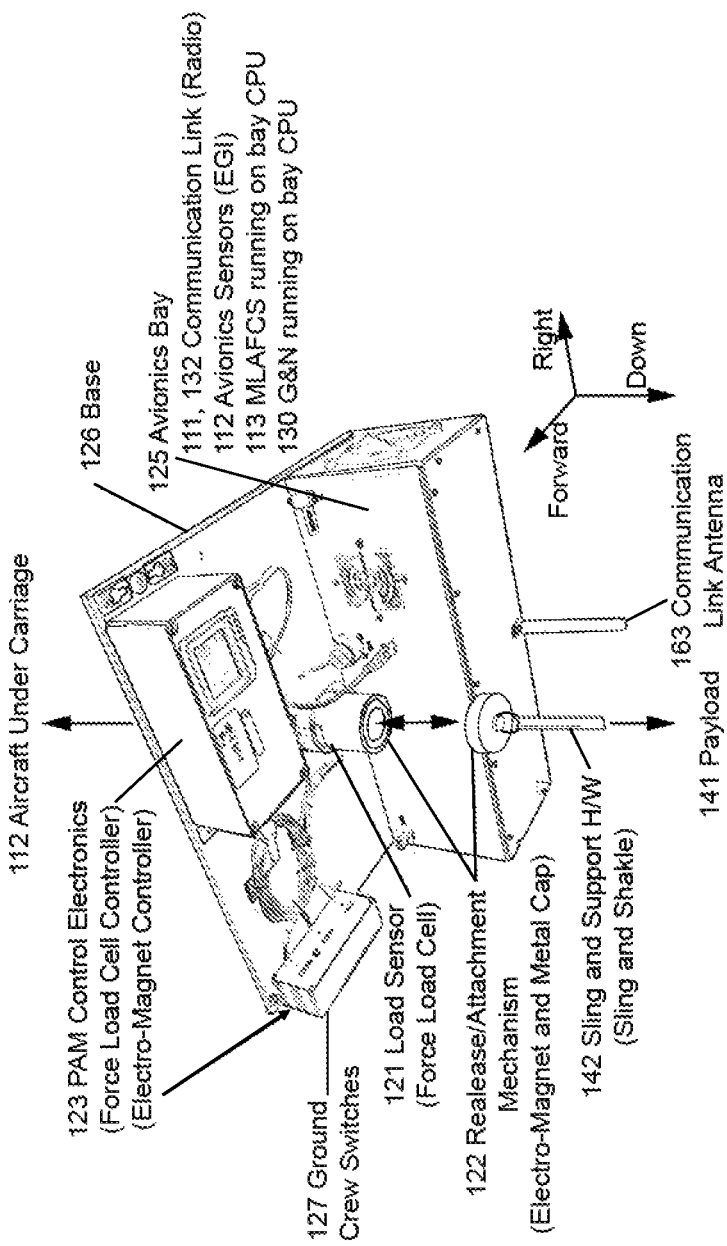
FIG. 4 is a perspective view of a Payload Attachment Mechanism (PAM) implemented as a single palette unit, according to embodiments of the multi-lift system with synchronized maneuvering and load feedback control disclosed herein.

An embodiment of a more compact, single palette unit is shown in FIG. 4, where the view is from underneath the device mounted on the aircraft undercarriage. This device contains the elements needed for this multi-lift system and was flown on a pair of demonstration aircraft (Ref. 1) and serves as useful example of a physical realization of the previously described components. An avionics bay 125 houses avionics sensors 112 in the form of an EGI that provides aircraft position, velocity, accelerations, attitude, and attitude rate measurements. A computer in the bay runs the MLAFCS 113 and G&N systems 130. The bay houses a radio, which is used for the communication link (111, 132). In this embodiment, the load sensor 121 is a force transducer mounted on the base 126. Mounted to the load sensor 121 is the release/attachment mechanism 122, which is an electro-magnet that is energized and de-energized to attach and release the metal cap. The sling and support hardware 142 are the sling and shackles used to attach the sling to the cap and the payload 141. The PAM control electronics 123 is composed of the force load cell controller unit in one box and the electro-magnet controller in another box along with the ground crew switches 127.

Figure 5:
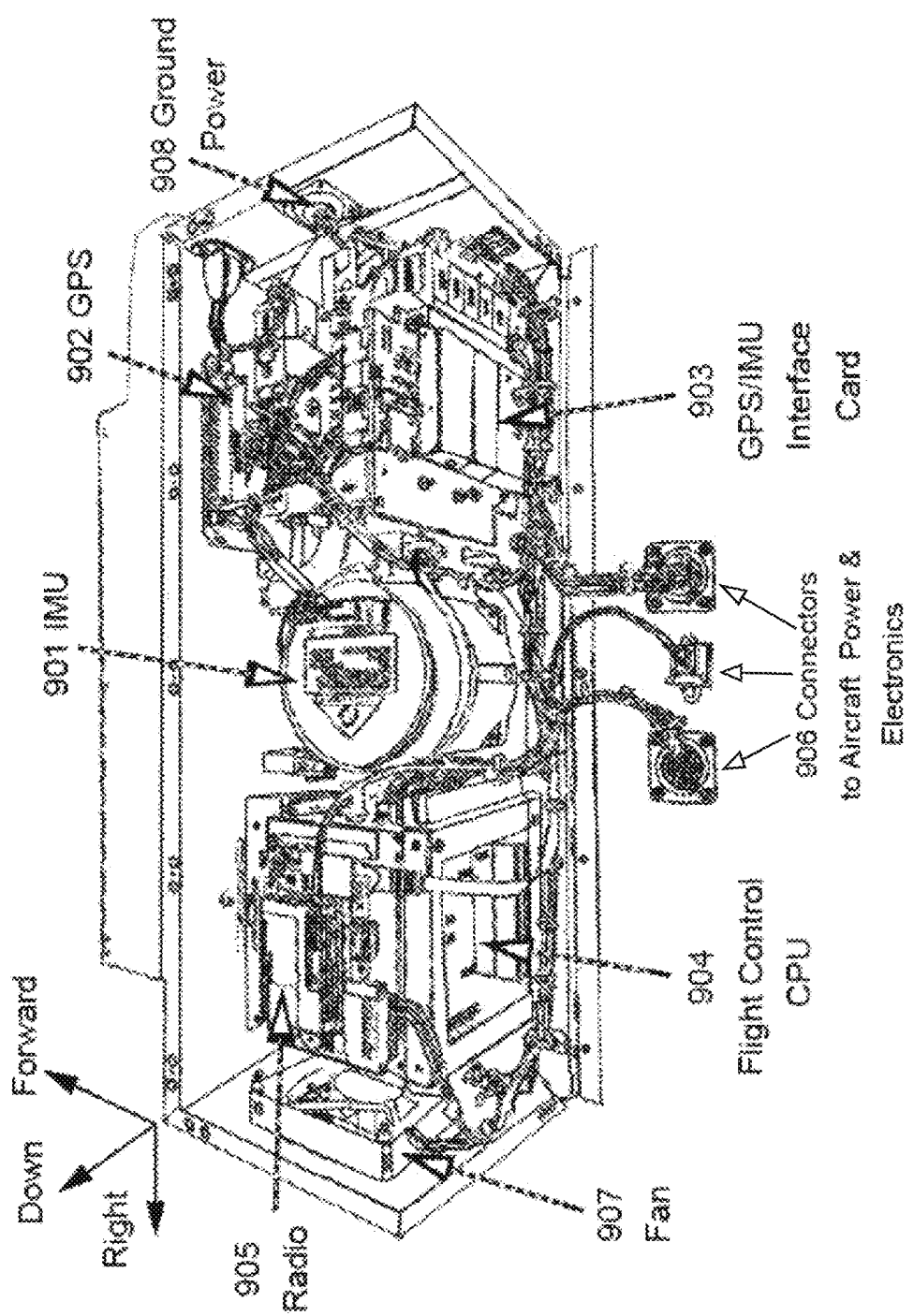
FIG. 5 is a perspective (rear) view of an open electronics bay of a VTOL aircraft, including various electronic, mechanical, and electromechanical components, according to embodiments of the multi-lift system with synchronized maneuvering and load feedback control disclosed herein.

A rear view of the opened electronic the bay is shown in FIG. 5, which shows selected components of the multi-lift hardware. A flight control computer 904 runs the MLAFCS 113 and G&N 130 systems. A radio 905 provides the communication link to the other aircraft and the operator station. The Inertial Measurement Unit (IMU) 901, Global Positioning System (GPS) unit 902, and interface card 903 generate the aircraft state used in the path tracking logic. The actuator commands are directed through the connectors 906 and aircraft power and system information is also transmitted back into the bay from these connectors.

Alternate embodiments of the PAM are possible. A mechanical device to hold and release heavier loads could be devised. Pyro-cutters or explosive bolts could be used as the emergency release when load exceedances occur. A sling with the release on the load end could be devised, where the unloaded sling could be reeled in for storage. A retractable sling could also provide an additional control to help regulate the load tensions.

Figure 6B:
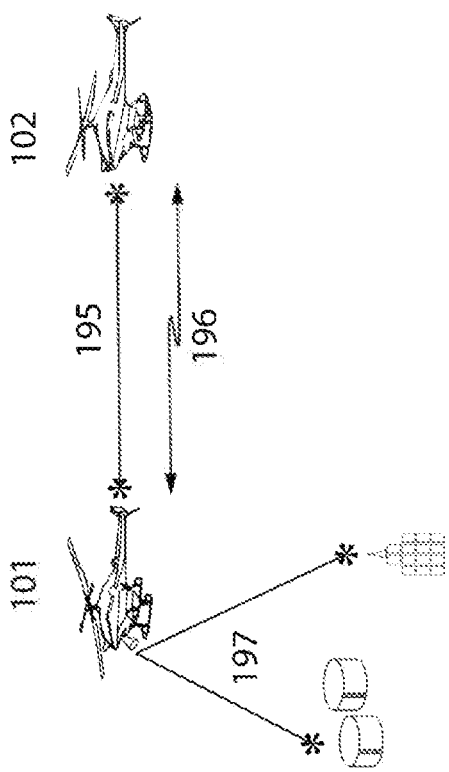
FIG. 6B is a diagram illustrating an example technique implemented by the multi-lift system with synchronized maneuvering and load feedback control to obtain aircraft and formation positions, according to embodiments disclosed herein.
Figure 6C:
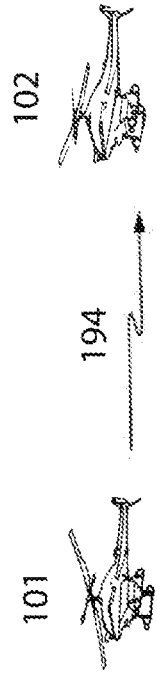
FIG. 6C is a diagram illustrating yet another example technique implemented by the multi-lift system with synchronized maneuvering and load feedback control to obtain aircraft and formation positions, according to embodiments disclosed herein.
Figure 6A:
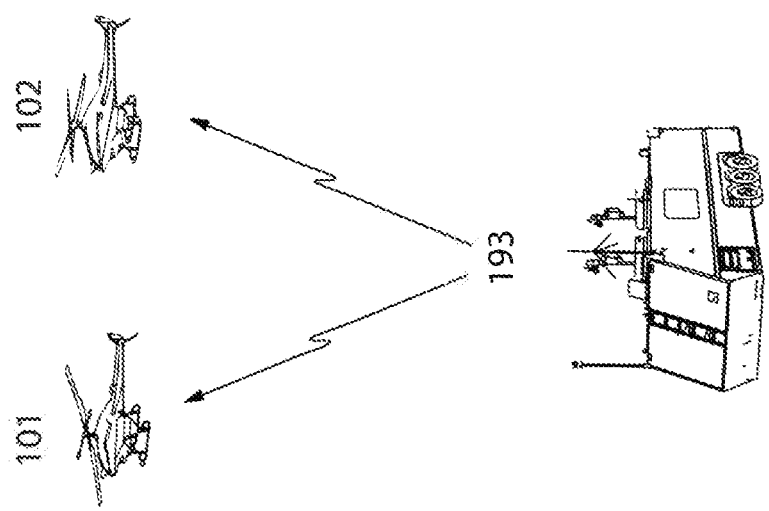
FIG. 6A is a diagram illustrating an example technique implemented by the multi-lift system with synchronized maneuvering and load feedback control to obtain aircraft and formation positions, according to embodiments disclosed herein.

The system requires accurate relative aircraft position to avoid aircraft collision, while accuracy of the whole formation position is less important unless near the ground or obstacles. There are several embodiments to get the required combination of position accuracies, some of which are shown FIGS. 6A-6C. If a ground base station is nearby, as in example 190 in FIG. 6A, then accurate differential positions can be obtained from the GPS units by sending correction 193 to each aircraft. This situation may occur when the system arrives or departs a controlled base of operations.

If far from a ground base station (191 in FIG. 6B), then a moving base station in the primary aircraft 101 could send correction 194 to the secondary aircraft so it could get an accurate relative position with respect to the primary aircraft, which is all that is needed to avoid collisions. The primary aircraft would still have non-differential GPS position, which combined with other typical instrument navigation methods would be accurate enough to navigate to a destination.

In a completely GPS-denied situation (192 in FIG. 6C), onboard ranging sensor 195, such as sonars or laser range finders, could be used to get accurate relative positions, which could be shared amongst the aircraft 196 to retain an accurate formation relative to the primary aircraft. The primary aircraft could carry a sensor 197, such as lasers and radar which can be used in localization methods to get an accurate position of itself relative to these landmarks.

RETURNING NOW TO THE BLOCK DIAGRAM OF FIG. 3, the multi-lift system is designed so the primary G&N system 130 can communicate through a low bandwidth high-latency link 162. The operator station 150 sends only small macro-commands (such as set course and heading or fly a route through widely separated waypoints) that can be reliably transmitted over such a link. The G&N system 130 then directs the primary aircraft MLAFCS 113 and uses a low-latency high-reliable link 161 to guide the secondary aircraft 102 by streaming low bandwidth velocity commands to each aircraft. This data stream is then converted to high rate tracking data onboard by the respective secondary aircraft's MLAFCS 113. Thus, the system avoids sending complex tracking data (such as spline fit data or high rate data) over long distances making the system more robust in a poor communication environment.

In this multi-lift system, the primary aircraft MLAFCS 113 controls the formation shape and flight direction by commanding the secondary aircraft 102 using velocity vector commands. Because of this method and the inherent delays in response in each aircraft, multi-lift synchronized maneuvering is used to keep the secondary aircraft 102 position in the desired relative position from the primary aircraft 101.

Using synchronized maneuvering, the system can alter the formation to allow for some load adjustments by anticipating the maneuvers being directed from the primary G&N system 130. For example, if an equally loaded side-by-side dual-lift pendant formation (shown in FIG. 3) is in forward flight, the primary aircraft 101 could bank the entire formation in anticipation of a commanded sustained turn. This action helps to equalize the load tensions on all aircraft, but it would not be sufficient to tightly regulate the load distribution particularly when the formation is in unsteady maneuvering conditions or in turbulent environments.

This multi-lift system addresses this issue by using the load instrumentation in the PAM 120 to directly measure the sling loads. These direct sling load measurements allow the secondary aircraft 102 to use feedback on the desired sling tensions to change its position relative to the primary aircraft 101 nominal formation. The secondary aircraft 102 can make these adjustments much faster than the primary formation control so the feedback is very effective at reducing load deviations due to atmospheric turbulence, maneuvering, and other uncertainties in the system (e.g. cable lengths, load mass, etc.).

For formations that do not fully constrain the load swinging motion (such as the dual-lift formations (105, and 106) shown in FIG. 2A and FIG. 2B, Load Swing Feedback (LSF) can be used to augment the damping of the swing motion. An embodiment using a three axis sling load measurement system would allow the estimation of the sling angles relative to the aircraft, which can be used in feedback to damp the swinging motion; an alternate equivalent sensor embodiment could use a cable tension sensor with a two angle cable measurement system. Placing the load on the ground, without excessive lateral motion is important to avoid damaging loads from impact or from tipping over. The increased swing damping eases placement of the load on the ground by reducing these unwanted lateral motions faster allowing a higher operational tempo.

The synchronized motion, load distribution control, and load swing feedback are handled by the MLAFCS system and an embodiment of each of these features is described in subsequent sections. Operation of the MLAFCS 113 on each aircraft is shown in the block diagram of FIG. 7, which shows data flow between the various systems, subsystems and components of the MLAFCS. Systems and components of the primary aircraft 101 systems are represented at the top of the figure and systems and components of the secondary aircraft 102 systems are represented at the bottom of the figure.

Figure 7:
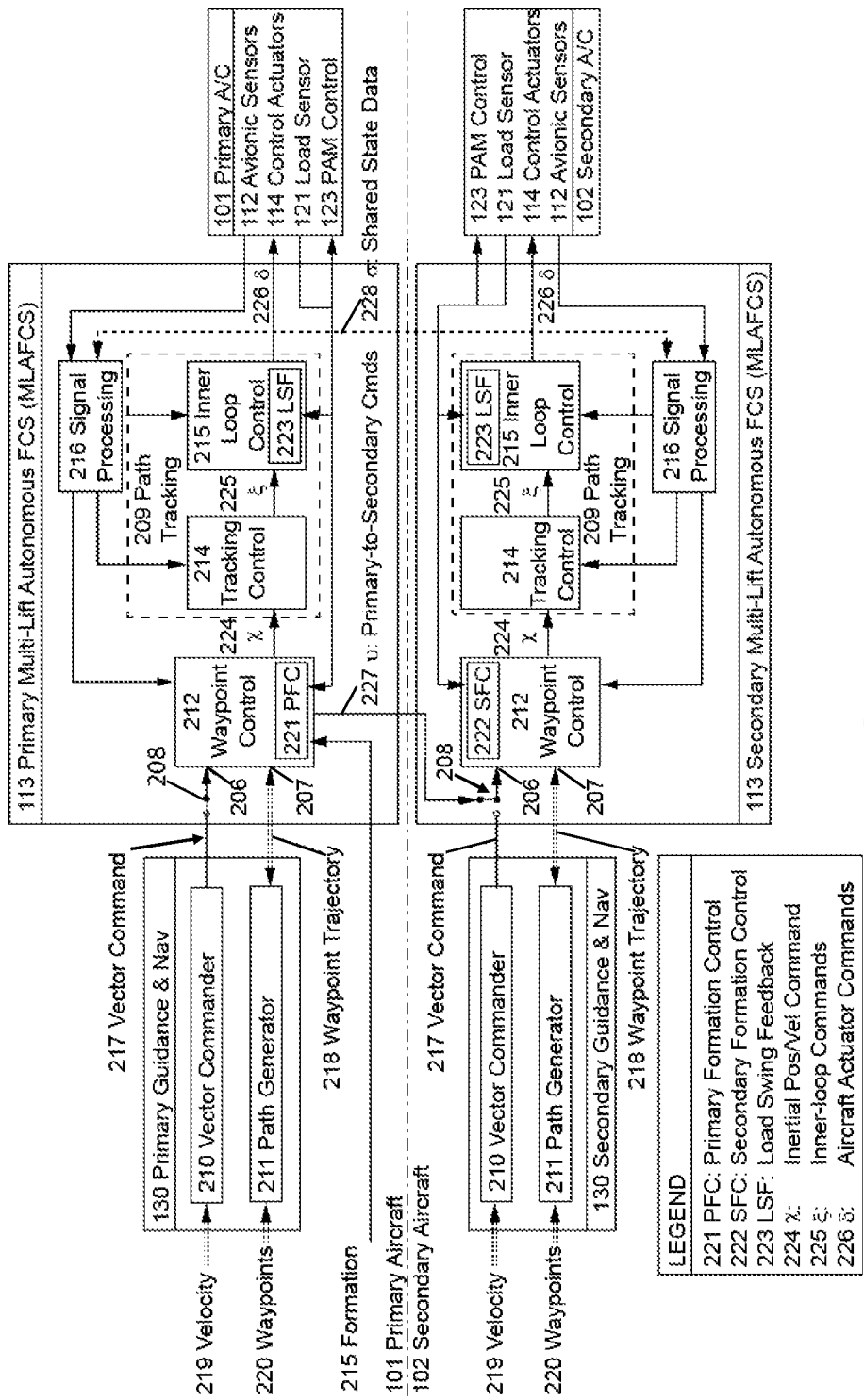
FIG. 7 is a logical block diagram illustrating interactions between the primary Multi-Lift Autonomous Flight Control System (MFLACS) and a secondary MFLACS, according to embodiments of the multi-lift system with synchronized maneuvering and load feedback control disclosed herein.

Before describing the MLAFCS in multi-lift mode, it is necessary to describe how it works when it is only directing a single aircraft. This is operationally necessary, since the aircraft in a multi-lift operation may need to move independently of each other to position themselves before or after the load is attached or released. Looking at the primary system at the top left of FIG. 7, there are two guidance systems to direct the control system in the G&N system 130: the Path Generator 211 and the Vector Commander 210. The Path Generator 211 method allows the operator to specify a predetermined path by entering a few widely separated waypoints along with macro-level parameters such as maximum speed, climb rate, and acceleration limits. These waypoints are spline-fitted into a smoothed set of Waypoint Trajectory 218 data that is sent to the waypoint-trajectory interface 207 of the Waypoint Control 212. The Vector Commander 210 receives discrete desired command velocities 219 in the form of speed, glide slope and heading rate change and generates a stream of Vector Commands 217 that are sent to the vector-command interface 206 of the Waypoint Control 212. A switch 208 is available to give alternate external guidance algorithms access to vector-command interface 206. In FIG. 7, the primary switch 208 is set to the down position and does not show an alternate source to the Vector Commander 210.

The Waypoint Control 212 has a waypoint-trajectory interface 207 that accepts a series of waypoints from the Path Generator 211 that includes position, velocity, acceleration, and time information to navigate the path. It also has a vector-command interface 206 that accepts a time sequence of velocity commands from the Vector Commander 210. Regardless of which of these mutually exclusive inputs is used, the Waypoint Control 212 smooths and limits the inputs and converts the guidance information into a stream of kinematically consistent Inertial Position/Velocity Commands ($\chi$)224 sent to the Path Tracking 209.

The Path Tracking 209 can take various forms, but in this embodiment it has been broken into two main components: Tracking Control 214 and Inner-Loop Control 215. The important behavior of the Path Tracking is that it uses feedback from the avionics sensors 112 to track a kinematically consistent set of position and velocity commands and should drive any constant velocity errors or disturbances to zero. Numerous feedback design methods are available to realize the Path Tracking 209 including Proportional-Integral-Derivative (PID) feedback and Linear Quadratic Regulator, and Model Predictive Control, to name a few.

The Tracking Control 214 tracks the Inertial Position/Velocity Commands ($\chi$) 224 generated from the Waypoint Control 212 and passes aircraft-referenced Inner-Loop Commands ($\xi$) 225 to the Inner-Loop Control 215. The Tracking Control 214 acts as the autopilot around the Inner-Loop Control 215 and can operate in a hover mode and forward-flight mode and can transition between them smoothly.

The Inner-Loop Control 215 provides the primary attitude and flight path stabilization of the system and uses the aircraft-referenced outputs, $\xi$ 225 from the Tracking Control 214 as its inputs and generates, at minimum, four de-mixed lateral, longitudinal, pedal, and collective (or power) stick positions ($\delta$) to command the VTOL aircraft.

For multi-lift operation, the MLAFCS combines the single aircraft systems together by including the additional elements (221, 222, and 223) in FIG. 7 along with inter-aircraft data (227 and 228). The primary aircraft 101 is still commanded as a single aircraft, where it is directed using either the Vector Commander 210 or Path Generator 211. The secondary aircraft 102, however, are now constrained by commands from the primary aircraft 101 through the Primary-to-Secondary Commands 227 being sent to the vector-command interface 206 on the secondary Waypoint Control 212, where the secondary switch 208 is set in the up position. Each aircraft is aware of the other's state and load information through the Shared State Data 228 that is being transmitted though the aircraft-to-aircraft communication link 111 along with the Primary-to-Secondary Commands 227.

The primary Waypoint Control 212 contains a Primary Formation Control (PFC) 221 to control the formation position of the secondary aircraft 102 with respect to the primary aircraft 101. The PFC 221 commands contain the position and velocities to arrange the configuration of the formation and move it in a coordinated fashion. For example, placing the secondary at an angular position behind the primary at a specified distance while coordinating a sustained turn. The PFC 221 is aware of the position of the secondary aircraft state and load, and commands as an open-loop feed-forward method to adjust the formation of configuration. The PFC 221 can take many forms. A simple form would be one that emits constant bias inputs relative to the primary aircraft 101 causing a fixed formation. Alternately, it could contain complex behaviors to adjust the arrangements to optimize the load distribution based on measured wind conditions and maneuvering. In any case, this would only generate feed forward adjustment and would be susceptible to disturbances and uncertainty.

The secondary Waypoint Control 212 contains the Secondary Formation Control (SFC) 222 (shown in FIG. 7) that allows the secondary aircraft 102 to move itself with respect to the position commanded by the primary aircraft 101. The commands from the SFC 222 are meant to be small orthogonal position changes relative to the PFC 221 configuration commands. Used in this way, the SFC 222 acts as fine position control (feedback), while the PFC 221 commands larger, macro, configuration controls (feed forward). Since SFC 222 is aware of the position of the primary aircraft 101 and the sling load it can make adjustments to its position to regulate the sling tensions. Unlike the primary aircraft 101, the secondary aircraft 102 is always being controlled through its vector-command interface 206 from the primary aircraft. As with the PFC 221, the SFC 222 can have many possible feedback strategies to regulate the load distribution depending on the operation. Specific examples of such feedback laws will be described later. All aircraft carry the same MLAFCS 113 so each have the same PFC 221 and a SFC 222 modules and can act in the primary or secondary role. The figure only shows the active modules when the aircraft are in their designated roles.

For load swing motion damping control, the primary and secondary Inner-loop Control 215 in FIG. 7, have Load Swing Feedback (LSF) blocks 223 integrated within. These blocks also share information about the other vehicle's sling load measurements via the Shared State Data 228. Therefore, LSF 223 can be implemented to damp the swinging motion of the load using the state of the entire system to command the respective stick commands of each aircraft.

FIG. 7 is a block diagram of the primary and secondary Waypoint Control 212 implementing the Multi-Lift Synchronized Maneuvering. In particular, FIG. 7. shows data flow involved in Multi-Lift Synchronized Maneuvering. The flow of a command in the MLAFCS starts on the primary aircraft 101 either through a stream of vector commands 217 or a waypoint trajectory 218 entering through their respective interfaces (206 and 207). At each interface, the data is transformed and smoothed into inertial coordinates using the shown transforms (350 or 351). The command switches 352 are set to produce the command position 348 and velocity 349 depending on which command interface (206 or 207) is chosen. These commands (348 and 349) are then delayed by $\tau_d$ seconds 354 and sent to the primary Tracking Control 214 as $\chi$ 224. The inertial commands (348 and 349) are summed with commands from the PFC 221 and are delayed (355 and 356) to create the secondary position and velocity commands (361 and 362).

The primary delay 354 delays the command to the primary Tracking Control 214 to compensate for inherent delays to command the secondary aircraft, which results from the design of the path following control law. The other delays $\tau_p$ and $\tau_v$ (in 355 and 356) allow the secondary command positions and velocities (361 and 362) to be adjusted to approximately match the primary delay 354. A first approximation for the delays are $\tau_d=\tau_v=D$ and $\tau_p=0$, where D is the expected time delay of the position response of the path tracking to a commanded change in position, which is a measured value and depends on the performance of the path tracking control law.

The secondary position and velocity commands (361 and 362), time 330, and primary position and velocity commands (331 and 332) comprise the Primary-to-Secondary Commands 227. To keep the data transfer bandwidth between aircraft low, the Primary-to-Secondary Command 227 data is sub sampled prior to sending to the secondary aircraft. This is done because the MLAFCS 113 will likely run at a much higher rate than the desired rate at which the Primary-to-Secondary Commands 227 need to be sent.

The secondary Waypoint Control 212 buffers the commands in the Synchronization Buffer 359, which ensures the times stamps of the commands are consistent between the two aircraft. This is done as an added safety measure to avoid large position transients, which can be caused by any large inadvertent time delays in the communication between the aircraft when they are in motion. This also can be used to monitor the system to take the necessary corrective action in the event of a communication failure.

This sub-sampling process in the primary Waypoint Control 212 prior to sending the data 227 creates stair-stepped position commands when the system is moving, which can cause ratcheting of the control system if allowed to enter the secondary Tracking Control 214 as $\chi$ 224. To avoid this, the buffer 359 also extrapolates the incoming command 227 based on current velocity and position.

The secondary MLAFCS 113 is always configured in vector command mode by setting the secondary switch 208 in the up position. The primary position and velocity (331 and 332) are also relayed to the secondary aircraft as well as the secondary position and velocity commands (361 and 362). The secondary MLAFCS 113 accepts the secondary velocity commands 362 as it normally would accept vector commands 217 at 206 in single aircraft mode. Since the secondary is locked in velocity command mode, it integrates the velocity 353 to generate the internal position 346. Over time, the primary and secondary internal positions 346 will drift apart causing position errors between the aircraft. To avoid this drift on the secondary side, the error 365 between the internal position 346 and commanded position 361 is reduced to zero with the Limited Proportional/Integral (PI) Control 358.

Figure 9:
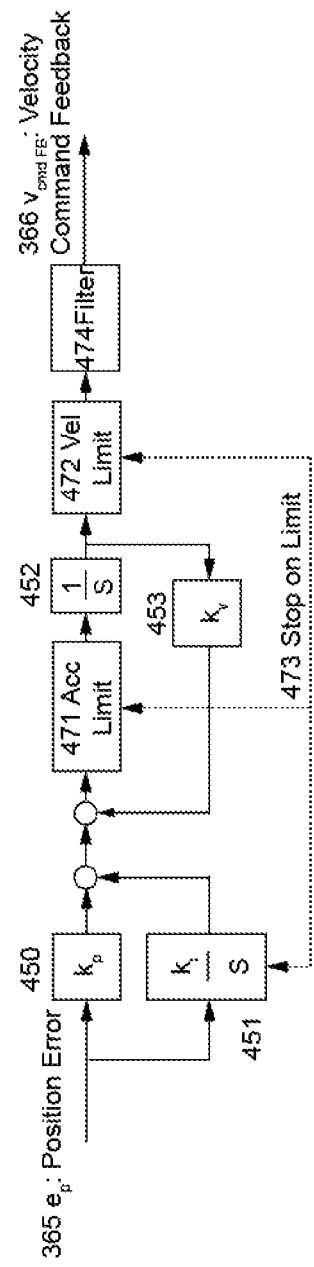
FIG. 9 is a logical block diagram illustrating velocity and acceleration limited Proportional-Integral (PI) control for maneuver synchronization, according to embodiments of the multi-lift system with synchronized maneuvering and load feedback control disclosed herein.

An expanded view of the Limited Proportional/Integral (PI) Control 358 is shown in FIG. 9. It sends the error 365 signal though a proportional 450 and integral 451 gain block and sums them prior to sending through an acceleration limiter 471 followed by an integrator 452 and feedback gain 453. The signal then is sent through a velocity limiter 472 followed by more filtering 474 before being returned as a velocity command feedback 366. The limiters (471 and 472) communicate to the integrator 451 to stop integrating upon reaching their limits to avoid it from winding up.

Figure 8:
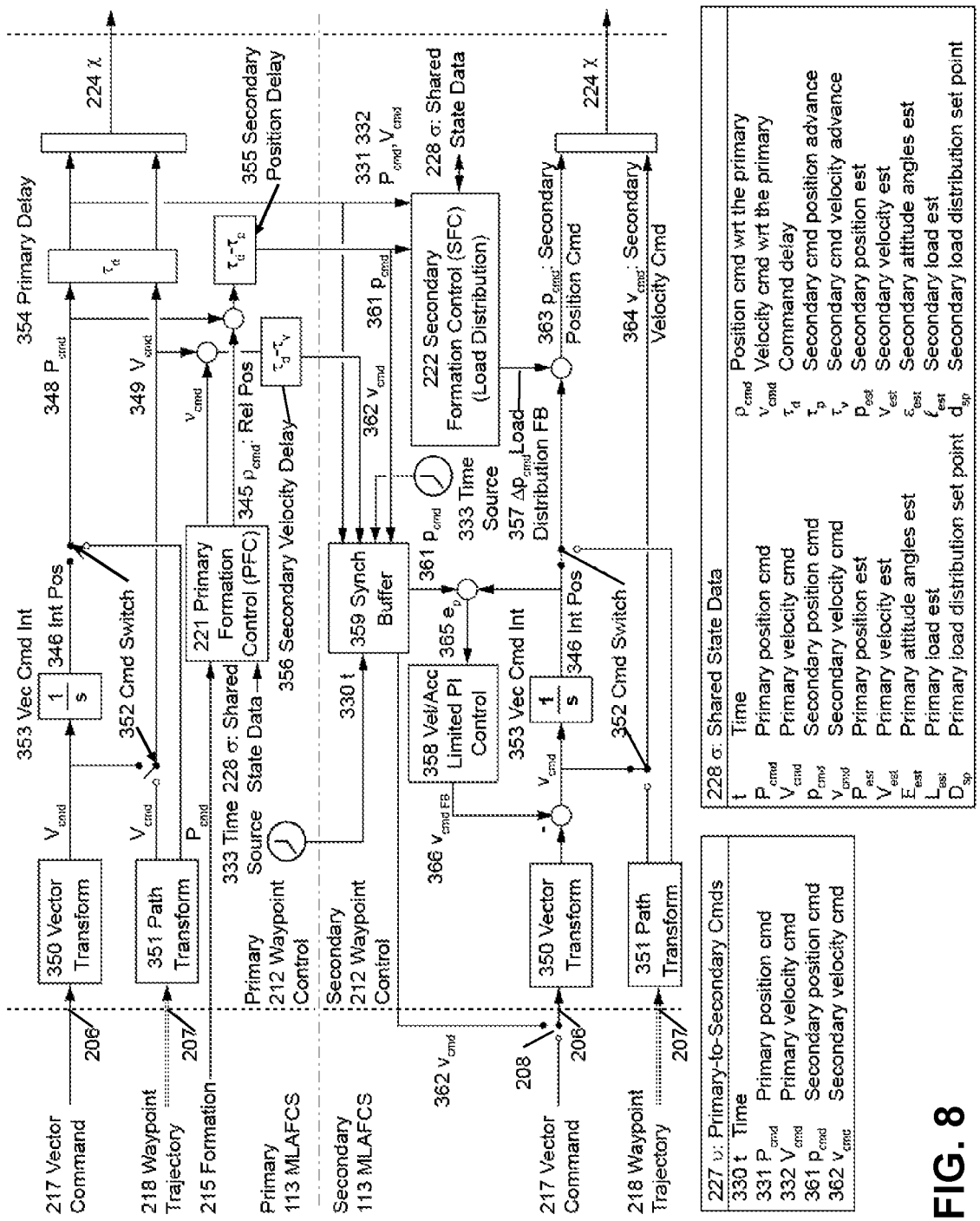
FIG. 8 is logical block diagram illustrating synchronization of the secondary VTOL aircraft with the primary VTOL aircraft, and integration of Primary Formation Control and Secondary Formation Control, according to embodiments of the multi-lift system with synchronized maneuvering and load feedback control disclosed herein.

In FIG. 8, this output 366 feedback forces the secondary internal position 346 from the integrator 353 to match the position in the primary 348 plus its PFC output 345, thus preventing the secondary internal position 346 from drifting from the primary commanded position to the secondary 361. The synchronized internal position 346 is then summed with the output from the SFC 222 to get the desired position 363. The velocity 364 and position 363 are then sent to the secondary tracker, χ224. The synchronization moves the aircraft to together to the precision the Path Tracking 209 can hold its respective aircraft on the desired path and position along the path.

In FIG. 8, if the output of the PFC 345 are fixed values and the output of the SFC 357 are zero, then the aircraft formation would stay fixed. As the system maneuvered and experienced disturbances the load distribution would change and could lead to dangerous sling load exceedances. To regulate these loads, control is distributed to the PFC 221 and SFC 222 on separate aircraft to act as a single control for the entire system. This control is shown in FIG. 10, where the PFC 221 is on the top of the figure and acts as the feedforward and the SFC 222 is on the bottom and acts as the feedback.

Figure 10:
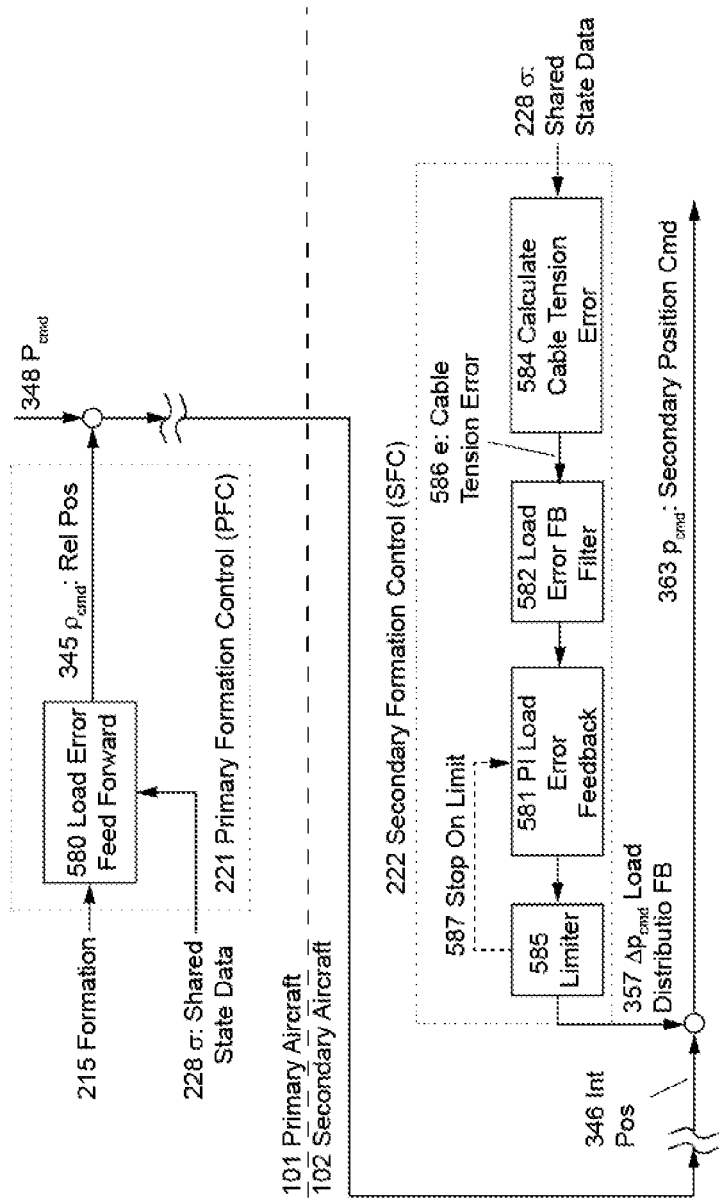
FIG. 10 is logical block diagram illustrating load distribution control as implemented in the Primary Formation Control, and the Secondary Formation Control, according to embodiments of the multi-lift system with synchronized maneuvering and load feedback control disclosed herein.

In FIG. 10, the PFC 221 is aware of the position of the secondary aircraft and the load from the Shared State Data 228. It could also have access to aircraft performance information from the higher Executive Level Controller 152 in the operator station 150, such as the load carrying capacity of each aircraft. Using this information, the PFC 221 adjusts the formation to properly distribute the load to the attached slings. A simple example of a feedforward PFC for two aircraft in a side-by-side formation (such as in FIG. 10), would be to change the height of the secondary aircraft relative to primary aircraft as the formation entered a sustained turn. The centripetal acceleration of the turn would cause more sling load on the aircraft on the inside of the turn, so raising the aircraft on the outside of the turn proportional to the turn rate would offload the load on the aircraft on the inside. These adjustment are feedforward adjustments and have limited ability to deal with rapidly changing or unknown disturbances. Furthermore, the data link, although reliable still has inherent delays that make this part of the control less able to react quickly.

The SFC 222 is shown in the bottom of FIG. 10 and provides the feedback 357 portion of the regulation to handle disturbances and uncertainty. The SFC 222 commands the secondary position 363 with respect to the position 346 commanded by the primary aircraft. The commands 357 from the SFC 222 are meant to be small orthogonal position changes relative to the PFC 221 formation commands. Used in this way, the SFC 222 acts as fine position control (feedback), while the PFC 221 commands larger, macro, formation controls (feed forward). Since the SFC 222 is aware of the position of the primary aircraft, load, and the desired load distribution from the Shared State Data 228 it can calculate the load distribution error 584. Extra filtering 582 may be needed to notch out sling modes in the error signal depending on the sling configuration. Finally, the error is passed through the Proportional/Integral Load Error Feedback 581. The integral feedback allows the feedback to have 1/s disturbance rejection eliminating any bias error in the load distribution. To protect against excessive position commands a signal is passed to a limiter 585, which can stop the integrator in the PI Feedback 581 from winding up using the Stop-On-Limit 587 signal. The output of the limiter is then added with the PFC 221 feedforward to generate the formation change 363, that is sent out with the secondary inertial position command χ224.

Using a simple equally loaded side-by-side example, the error 584 is the difference between the two aircraft sling tensions and the SFC output 357 is height change. If the error increases, the secondary aircraft will automatically change height as it sees the error rise due to a sustained turn maneuver. If the formation, were to experience turbulent conditions the feedback would regulate the secondary height to keep the loads the same. Imperfect tracking may cause the separation between the aircraft to change, but the feedback will also compensate for this by keeping the loads the same.

Alternate methods to design the PFC feedforward are possible using more advanced control design methods. Optimization methods could also be employed to find the most fuel efficient formation given more measured performance data. Adding another secondary aircraft creating a tri-lift formation turns the feedback control design into a Multi-Input, Multi-Output (MIMO) design problem. The orientation of the two secondary aircraft would determine how much coupling between the two feedback loops existed.

If the multi-lift configuration is such that there can be unconstrained motion of the load due to swinging motion, the LSF 223 in FIG. 7 can be used to help damp these out.

Figure 11:
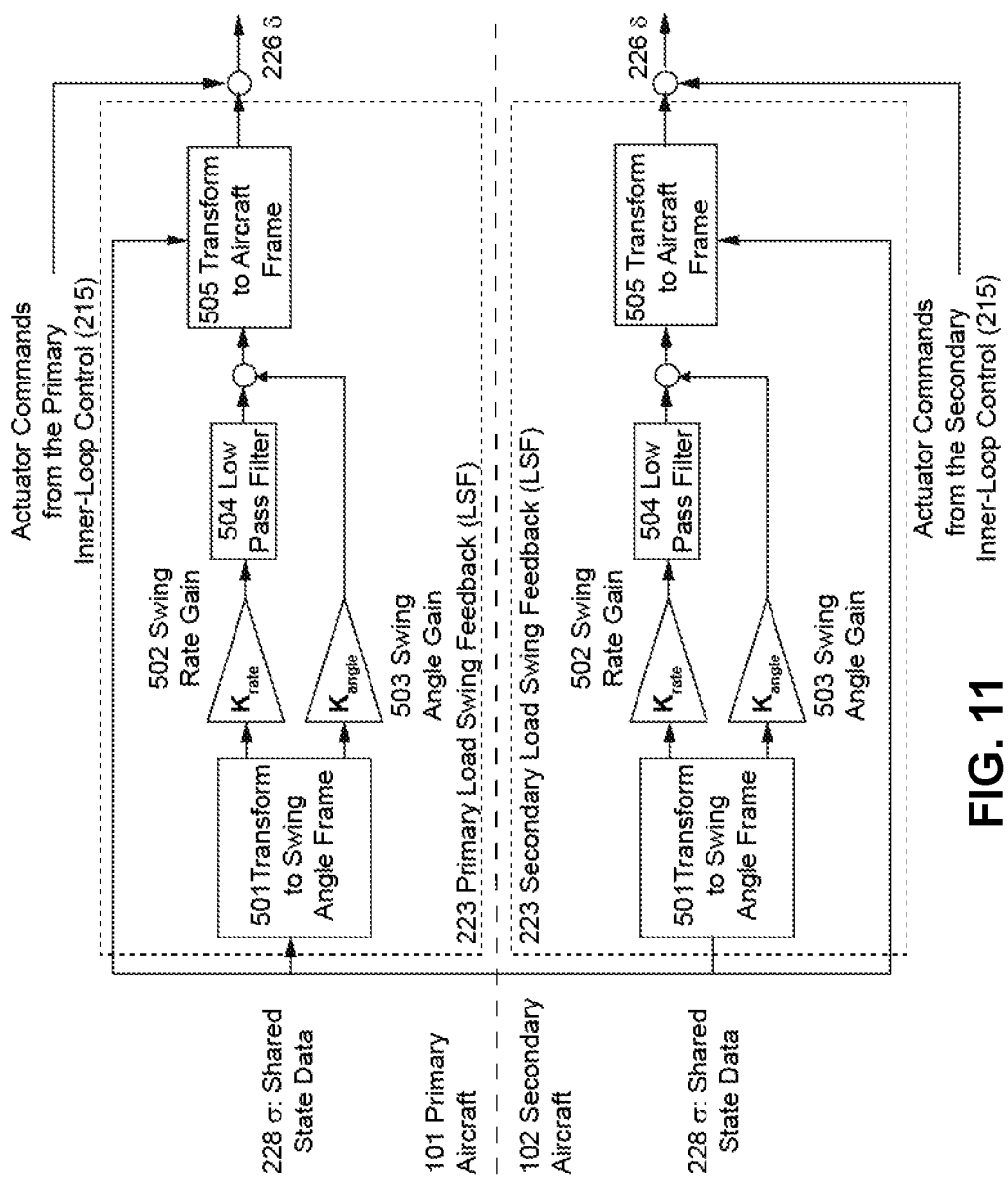
FIG. 11 is a logical block diagram illustrating Load Swing Feedback control in the primary VTOL and secondary VTOL aircraft, according to embodiments of the multi-lift system with synchronized maneuvering and load feedback control disclosed herein.

The LSF 223 embodiment is shown in FIG. 11 for a two aircraft lifting system. On each aircraft, the LSF 223 uses the Shared State Data 228 to compute the swing angle of the load between the aircraft using the transform 501 in the figure. The secondary aircraft can be at any point around the primary aircraft, so a transformation aligned with the axis of swing rotation is needed. The angle and angular rate of the swing can be estimated by using the three axis force measurements or by a sensor that can measure the sling angles. The angle and rate are each scaled by the respective gains (502 and 503). The angular rate can be noisy so additional filtering is applied 504 before passing the sum of the signals into a transform 505 that converts the feedback back into the aircraft axes of control. The signals from the transform 505 are then summed with the Inner Loop Control 215 to produce a total set of 5, Aircraft Actuator Commands 226. Other load damping design methods and architectures can be used depending on the formation.

Persons of ordinary skill in the art should recognize that the various computing, electronics, communication, and sensor components discussed herein can be implemented using a wide variety of digital, analog, and hybrid technologies. Such components include (but are not limited to) operator station 150, executive controller 152, flight control avionics 110, communication equipment 111, sensors 112 and 113, Payload Attachment Mechanism control electronics 123, flight control computer 904, IMU 901, GPS 902, interface card 903, and radio 905. Computing may be provided by processors executing instructions stored in memory, by application-specific integrated circuits (ASICs), by field-programmable gate arrays (FPGAs), or by any combination thereof. Processors may be of varying core configurations (including multiple cores) and clock frequencies. Such functions may be provided by multiple processors or multiple cores on a single chip operating in parallel and/or communicably linked together. Such processors are in communication with a memory system, including one or more memory devices of varying physical dimensions, accessibility, storage capacities, etc. such as random access memory, read-only memory, electrically erasable read-only memory, etc., for storing program instructions for execution by a processor. In addition to processors and memory, computing systems are in communication with one or more computer-readable media storage devices, including (but not limited to) hard drives, flash drives, CD drives, DVD drives. These media may store instructions that, when executed by a processor, are configured to cause the processor to perform operations and execute algorithms to implement features of a multi-lift system as described herein. In addition to instructions for execution by a processor, these media may store data of all types. Computing systems may also include one or more network interfaces, bus interfaces, communication interfaces, etc. as well understood by persons of ordinary skill in the art.

Persons of ordinary skill in the art should also recognize that the software components discussed herein are abstractions chosen to illustrate how some embodiments of a multi-lift system partition functionality among components. Such persons should also recognize that other divisions of functionality are also possible, and these other possibilities are intended to be within the scope of this disclosure. Such persons should also appreciate that computer software can exist in a variety of forms. For example, the computer program can exist as one or more software programs, software modules, or both, that can be made of program instructions in source code, object code, executable code or other formats, firmware program(s), or hardware description language (HDL) files.

The invention claimed is:

1. An aircraft multi-lift system with synchronized maneuvering and load feedback control, the aircraft multi-lift system comprising:
a common load;
a plurality of Vertical Take Off and Landing (VTOL) aircraft, the plurality of VTOL aircraft consisting of one primary VTOL aircraft and one or more secondary VTOL aircraft;
a plurality of slings; and
an operator station operable to send and receive navigation commands and direct operations of the primary VTOL aircraft using macro level commands;
wherein each VTOL aircraft comprises a computing unit, a Payload Attachment Mechanism (PAM) package, a Flight Control Avionics package, and a Guidance & Navigation (G&N) package, the computing unit of each VTOL aircraft being configured to communicate with the PAM package and the Flight Control Avionics package corresponding to said VTOL aircraft;
wherein the PAM package of each VTOL aircraft is located on the underside of said VTOL aircraft and includes an attachment point, the PAM package of each VTOL aircraft being connected to the common load by one of the plurality of slings that extends from said common load to the attachment point, the PAM package of each VTOL aircraft further including a load measurement system having a load sensor located at the attachment point, the load sensor associated with each VTOL aircraft being configured to measure a force operating on the sling to thereby produce aircraft sling load data associated with the sling attached to the corresponding VTOL aircraft;
wherein the Flight Control Avionics package of each VTOL aircraft includes a communication link, at least one avionics sensor, and Multi-Lift Autonomous Flight Control System (MLAFCS), the communication link being operable to enable communication amongst the plurality of VTOL aircraft, at least one of the avionics sensor being configured to produce aircraft state data associated with the VTOL aircraft on which said avionics sensor is located, the MLAFCS system being configured to share the aircraft sling load data and the aircraft state data associated with the VTOL aircraft on which said MLAFCS is located with the other VTOL aircraft via the communication link;
wherein the MLAFCS of each VTOL aircraft includes a Waypoint Control System and a Path Tracking Module, the Path Tracking Module including a Tracking Control and an Inner Loop Control, the Waypoint Control System including a Limited Proportional/Integral (PI) Control;
wherein the Waypoint Control System of the primary VTOL aircraft converts input position commands from the G&N package into a stream of kinematically consistent position commands provided to the Path Tracking Module, said Waypoint Control System includes a Primary Formation Control (PFC), wherein the PFC of the primary VTOL aircraft is operable to control flight formation of the plurality of VTOL aircraft;
wherein the Tracking Control is operable to follow the stream of kinematically consistent position commands from the Waypoint Control and the Inner Loop Control is operable to provide attitude and flight path stabilization to each VTOL aircraft;
wherein the secondary MLAFCS is operable to be commanded in a vector command mode to accept a plurality of secondary velocity commands and a plurality of secondary position commands to generate a secondary internal position;
wherein the secondary Waypoint Control System of the secondary VTOL aircraft is operable to receive sub-sampled commands from the Primary Formation Control (PFC) of the primary VTOL aircraft and the secondary Waypoint Control System synchronizes the secondary internal position with the sub-sampled commands through the Limited PI Control, the Limited PI Control is operable to generate a velocity command feedback, the velocity command feedback forcing the secondary internal position to match the sub-sampled commands from the PFC to produce a synchronized internal position, the synchronized internal position being utilized by the secondary Path Tracking Module to keep the secondary VTOL aircraft in flight formation with the primary VTOL aircraft and to prevent position command drift between the primary VTOL aircraft and the secondary VTOL aircraft;
wherein the secondary Waypoint Control System of the secondary VTOL aircraft includes a Secondary Formation Control (SFC) operable to receive feedback from at least one load sensor and control load distribution by commanding small positional changes of the secondary VTOL aircraft relative to the flight formation commanded from the primary VTOL aircraft;
wherein the Secondary Formation Control (SFC) on the secondary VTOL aircraft provides load distribution feedback control, whereby the SFC is operable to calculate a load distribution error by taking into account a position of the primary aircraft, the common load, and a load distribution from a Shared State Data transmission, wherein the SFC includes a Proportional/Integral (PI) Load-Error Feedback operable to processes the load distribution error, wherein the SFC on the secondary VTOL aircraft is operable to produce small orthogonal position changes relative to the commands of the PFC to regulate the force operating on the sling;
wherein the SFC on the secondary VTOL aircraft provides load distribution feedback control using the Proportional/Integral (PI) Load-Error Feedback, the Proportional/Integral (PI) Load-Error Feedback including an integral feedback component, wherein the integral feedback component provides a 1/s disturbance rejection, thereby eliminating a bias error in the load distribution; and wherein the common load is not instrumented.

2. The multi-lift aircraft system of claim 1, wherein the computing unit of each VTOL aircraft is further configured to communicate with the G&N package, the operator station including a communication link with the G&N package corresponding to the primary VTOL aircraft and being configured to guide the aircraft multi-lift system using one or more macro commands.

3. The multi-lift aircraft system in claim 2, wherein the operator station is located onboard one of the plurality of VTOL aircraft.

4. The multi-lift aircraft system in claim 1, wherein for each VTOL aircraft, the shared aircraft state data and sling load data includes one or more of the following attributes: (i) position, (ii) velocity, (iii) acceleration, (iv) attitude, (v) attitude rate, (vi) air speed, (vii) altitude above ground level, (viii) sling load forces, and (ix) relative position amongst the other VTOL aircraft.

5. The multi-lift aircraft system in claim 1, wherein the aircraft state data corresponding to one of the plurality of VTOL aircraft includes a measurement necessary to support a path following control law navigating the corresponding VTOL aircraft on a commanded path.

6. The multi-lift aircraft system in claim 1, wherein the load measurement system of each VTOL aircraft is operable to detect one of: (i) a three axis force from the corresponding sling; or (ii) sling tension from the corresponding sling.

7. The multi-life aircraft system of claim 1, wherein the PAM package further includes:
    a sling release mechanism,
        wherein the computing unit on each VTOL aircraft is operable to control the sling release mechanism to release the sling corresponding to said VTOL aircraft from the attachment point.

8. The multi-lift aircraft system of claim 7, wherein the sling release mechanism for each VTOL aircraft is configured to release the sling corresponding to said VTOL aircraft at the same time so that the plurality of VTOL aircraft release the common load simultaneously.

9. The multi-lift aircraft system of claim 1, wherein each VTOL aircraft further includes a Guidance & Navigation (G&N) package, the G&N package on each VTOL aircraft being operable to receive macro command data corresponding to directions from the operator station, the G&N package of each VTOL aircraft being configured to communicate to the MLAFCS associated with said VTOL aircraft.

10. The aircraft multi-lift system of claim 1, wherein the Inner-Loop Control includes a Load Swing Feedback (LSF) on both primary and secondary VTOL aircraft to control load swing motion.

11. The aircraft multi-lift system of claim 1, wherein the Waypoint Control System outputs inertial position and velocity commands to guide the Tracking Control on a desired path, and the Tracking Control outputs inner loop commands necessary to command the stabilized Inner-Loop control along said path.

12. The aircraft multi-lift system of claim 11, wherein the inertial position and velocity commands and inner loop commands are summed to produce aircraft actuator commands.

13. An aircraft multi-lift system with synchronized maneuvering and load feedback control, the aircraft multi-lift system comprising:
    a common load;
    a plurality of Vertical Take Off and Landing (VTOL) aircraft, the plurality of VTOL aircraft consisting of one primary VTOL aircraft and one or more secondary VTOL aircraft;
    a plurality of slings; and
    an operator station;
    wherein each VTOL aircraft comprises a computing unit, a Payload Attachment Mechanism (PAM) package, a Flight Control Avionics package, and a Guidance & Navigation (G&N) package, the computing unit of each VTOL aircraft being configured to communicate with the Flight Control Avionics package, the PAM package, and the G&N package corresponding to said VTOL aircraft;
    wherein the PAM package of each VTOL aircraft is connected to the common load by one of the plurality of slings that extends from said common load to the attachment point, the PAM package of each VTOL aircraft further including a load measurement system having a load sensor, the load measurement system associated with each VTOL aircraft being configured to measure a force operating on the sling to thereby produce aircraft sling load data associated with the sling attached to the corresponding VTOL aircraft;
    wherein the Flight Control Avionics package of each VTOL aircraft includes a low latency communication link, at least one avionics sensor, and Multi-Lift Autonomous Flight Control System (MLAFCS), the low latency communication link being operable to enable communication amongst the plurality of VTOL aircraft, at least one of the avionics sensor being configured to produce aircraft state data associated with the VTOL aircraft on which said avionics sensor is located, the MLAFCS being configured to share the aircraft sling load data and the aircraft state data associated with the VTOL aircraft on which said MLAFCS is located with the other VTOL aircraft via the low latency communication link;
    wherein the G&N package of the primary VTOL aircraft is configured to receive small macro-commands from the operation station over a low bandwidth high-latency link and to subsequently direct said small macro-commands to the Flight Control Avionics package of said primary VTOL aircraft, the MLAFCS of the primary VTOL aircraft being configured to use the small macro-commands, the shared aircraft state data, and the shared aircraft sling load data to coordinate formation flying between the plurality of VTOL aircraft by issuing Primary-to-Secondary commands that are sent to the MLAFCS of the one or more secondary VTOL aircraft via the low latency communication link;
    wherein the MLAFCS of each VTOL aircraft includes a Waypoint Control System and a Path Tracking Module, the Path Tracking Module including a Tracking Control and an Inner Loop Control, the Waypoint Control System including a Limited Proportional/Integral (PI) Control;
    wherein the Waypoint Control System of the primary VTOL aircraft converts input position commands from the G&N package into a stream of kinematically consistent position commands provided to the Path Tracking Module, said Waypoint Control System includes a Primary Formation Control (PFC), wherein the PFC of the primary VTOL aircraft is operable to control flight formation of the plurality of VTOL aircraft;

wherein the Tracking Control is operable to follow the stream of kinematically consistent position commands from the Waypoint Control and the Inner Loop Control is operable to provide attitude and flight path stabilization to each VTOL aircraft;

wherein the secondary MLAFCS is operable to be commanded in a vector command mode to accept a plurality of secondary velocity commands and a plurality of secondary position commands to generate a secondary internal position;

wherein the secondary Waypoint Control System of the secondary VTOL aircraft is operable to receive sub-sampled commands from the Primary Formation Control (PFC) of the primary VTOL aircraft and the secondary Waypoint Control System synchronizes the secondary internal position with the sub-sampled commands through the Limited PI Control, the Limited PI Control is operable to generate a velocity command feedback, the velocity command feedback forcing the secondary internal position to match the sub-sampled commands from the PFC to produce a synchronized internal position, the synchronized internal position being utilized by the secondary Path Tracking Module to keep the secondary VTOL aircraft in flight formation with the primary VTOL aircraft and to avoid position command drift between the primary VTOL aircraft and the secondary VTOL aircraft;

wherein the secondary Waypoint Control System of the secondary VTOL aircraft includes a Secondary Formation Control (SFC) operable to receive feedback from at least one load sensor and control load distribution by commanding positional changes of the secondary VTOL aircraft relative to the flight formation commanded from the primary VTOL aircraft;

wherein the Secondary Formation Control (SFC) on the secondary VTOL aircraft provides load distribution feedback control, whereby the SFC is operable to calculate a load distribution error by taking into account a position of the primary aircraft, the common load, and a load distribution from a Shared State Data transmission, wherein the SFC includes a Proportional/Integral (PI) Load-Error Feedback operable to processes the load distribution error, wherein the SFC on the secondary VTOL aircraft is operable to produce small orthogonal position changes relative to the commands of the PFC to regulate the force operating on the sling;

wherein the SFC on the secondary VTOL aircraft provides load distribution feedback control using the Proportional/Integral (PI) Load-Error Feedback, the Proportional/Integral (PI) Load-Error Feedback including an integral feedback component, wherein the integral feedback component provides a 1/s disturbance rejection, thereby eliminating a bias error in the load distribution; and wherein the common load is not instrumented.

14. An aircraft multi-lift system with synchronized maneuvering and load feedback control, the aircraft multi-lift system comprising:
a common load;
a plurality of Vertical Take Off and Landing (VTOL) aircraft, the plurality of VTOL aircraft consisting of a primary VTOL aircraft and a secondary VTOL aircraft;
a plurality of slings; and an operator station operable to send and receive navigation commands and direct operations of the primary VTOL aircraft using macro level commands;

wherein each VTOL aircraft comprises a computing unit, a Payload Attachment Mechanism (PAM) package, a Flight Control Avionics package, and a Guidance & Navigation (G&N) package, the computing unit of each VTOL aircraft being configured to communicate with the PAM package and the Flight Control Avionics package corresponding to said VTOL aircraft;

wherein the PAM package of each VTOL aircraft is located on the underside of said VTOL aircraft and includes an attachment point, the PAM package of each VTOL aircraft being connected to the common load by one of the plurality of slings that extends from said common load to the attachment point, the PAM package of each VTOL aircraft further including a load measurement system having a load sensor located at the attachment point, the load sensor associated with each VTOL aircraft being configured to measure a force operating on the sling to thereby produce aircraft sling load data associated with the sling attached to the corresponding VTOL aircraft;

wherein the Flight Control Avionics package of each VTOL aircraft includes a communication link, at least one avionics sensor, and Multi-Lift Autonomous Flight Control System (MLAFCS), the communication link being operable to enable communication amongst the plurality of VTOL aircraft, at least one of the avionics sensor being configured to produce aircraft state data associated with the VTOL aircraft on which said avionics sensor is located, the MLAFCS system being configured to share the aircraft sling load data and the aircraft state data associated with the VTOL aircraft on which said MLAFCS is located with the other VTOL aircraft via the communication link;

wherein the MLAFCS of each VTOL aircraft includes a Waypoint Control System and a Path Tracking Module, the Path Tracking Module including a Tracking Control and an Inner Loop Control, the Waypoint Control System including a Limited Proportional/Integral (PI) Control;

wherein the Waypoint Control System of the primary VTOL aircraft converts input position commands from the G&N package into a stream of kinematically consistent position commands provided to the Path Tracking Module, said Waypoint Control System includes a Primary Formation Control (PFC), wherein the PFC of the primary VTOL aircraft is operable to control flight formation of the plurality of VTOL aircraft;

wherein the Tracking Control is operable to follow the stream of kinematically consistent position commands from the Waypoint Control and the Inner Loop Control is operable to provide attitude and flight path stabilization to each VTOL aircraft;

wherein the Inner-Loop Control includes a Load Swing Feedback (LSF) on both primary and secondary VTOL aircraft to control load swing motion;

wherein the secondary MLAFCS is operable to be commanded in a vector command mode to accept a plurality of secondary velocity commands and a plurality of secondary position commands to generate a secondary internal position;

wherein the secondary Waypoint Control System of the secondary VTOL aircraft is operable to receive sub-sampled commands from the Primary Formation Control (PFC) of the primary VTOL aircraft and the secondary Waypoint Control System synchronizes the secondary internal position with the sub-sampled commands through the Limited PI Control, the Limited PI Control is operable to generate a velocity command feedback, the velocity command feedback forcing the secondary internal position to match the sub-sampled commands from the PFC to produce a synchronized internal position, the synchronized internal position being utilized by the secondary Path Tracking Module to keep the secondary VTOL aircraft in flight formation with the primary VTOL aircraft and to avoid position command drift between the primary VTOL aircraft and the secondary VTOL aircraft;

wherein the secondary Waypoint Control System of the secondary VTOL aircraft includes a Secondary Formation Control (SFC) operable to receive feedback from at least one load sensor and control load distribution by commanding small positional changes of the secondary VTOL aircraft relative to the flight formation commanded from the primary VTOL aircraft;

wherein the Secondary Formation Control (SFC) on the secondary VTOL aircraft provides load distribution feedback control, whereby the SFC is operable to calculate a load distribution error by taking into account a position of the primary aircraft, the common load, and a load distribution from a Shared State Data transmission, wherein the SFC includes a Proportional/Integral (PI) Load-Error Feedback operable to processes the load distribution error, wherein the SFC on the secondary VTOL aircraft is operable to produce small orthogonal position changes relative to the commands of the PFC to regulate the force operating on the sling;

wherein the SFC on the secondary VTOL aircraft provides load distribution feedback control using the Proportional/Integral (PI) Load-Error Feedback, the Proportional/Integral (PI) Load-Error Feedback including an integral feedback component, wherein the integral feedback component provides a 1/s disturbance rejection, thereby eliminating a bias error in the load distribution; and wherein the common load is not instrumented.

\* \* \* \* \*